Jan. 21, 1941.                J. W. MARTIN                 2,229,109
                              CONTROL VALVE
                          Filed Sept. 29, 1938
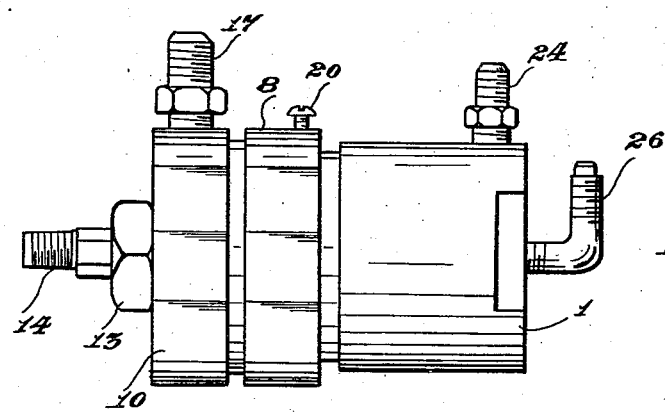
Fig. 1
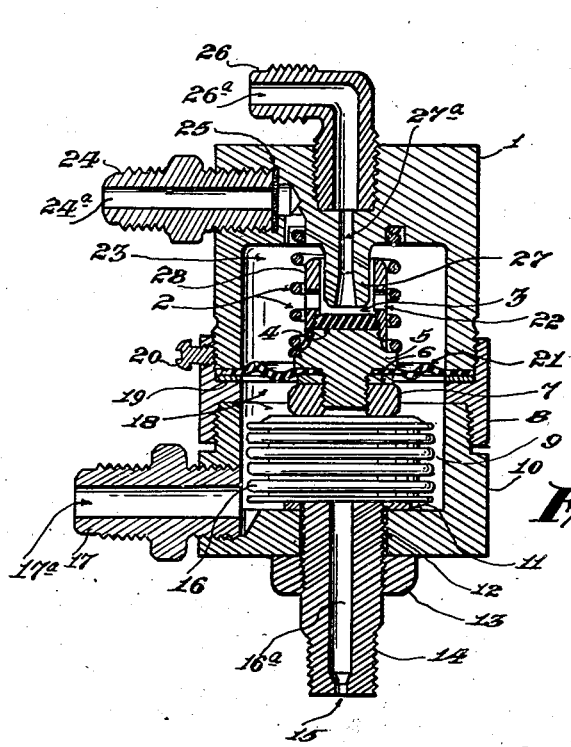
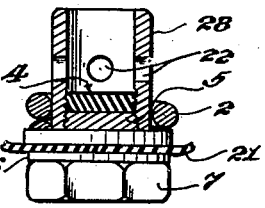
Fig. 2
Fig. 3
James Woodward Martin
INVENTOR.
BY John M. Spellmen
ATTORNEY.

Patented Jan. 21, 1941

2,229,109

UNITED STATES PATENT OFFICE 2,229,109

CONTROL VALVE

James Woodward Martin, Dallas, Tex.

Application September 29, 1938, Serial No. 232,415

4 Claims. (Cl. 137—153)

This invention relates to control valves of a type which automatically control the flow of a fluid used to control the temperature or pressure of some object or medium. Valves of this type are usually provided with an expansible chamber actuated by slight variations in pressure within said chamber. The expansible chamber is associated with a suitable valve in such a manner that actuation of the expansible chamber operates the valve, thereby controlling the flow of fluid through the valve. Control valves are usually constructed so that in case the expansible chamber ruptures, the fluid inside said chamber is permitted to pass into the valve chamber, or fluid from the valve chamber permitted to pass into the expansible chamber, or the fluid from the expansible chamber permitted to escape into the atmosphere, at the location of the control valve. Also, in case the valve chamber diaphragm, bellows, or packing ruptures or leaks, the fluid from the valve chamber is likewise allowed to escape into the atmosphere at the location of the control valve. In many instances, such conditions are not only undesirable but actually dangerous.

It is, therefore, the principal object of this invention to provide a safe, simply constructed control valve so constructed and operable that it controls the flow of a fluid used to control the temperature or pressure of some object or medium, the valve having an arrangement of parts whereby in case either the expansible chamber bellows or the valve chamber diaphragm ruptures, the escaping fluid will be conducted through a single vent to a predetermined and safe location.

It is also an object of this invention to restrict the expansible chamber inlet so that in case said expansible chamber bellows ruptures, the quantity of escaping fluid is reduced to a minimum. The restricted inlet is of such area with respect to the vent opening as to prevent appreciable increase in pressure in the vent chamber in case of rupture of said expansible chamber bellows.

Other and further objects of the invention will become apparent from a perusal of the following detailed description, taken in connection with the accompanying drawing, and wherein a preferred form of embodiment of the improved valve is clearly shown. The drawing illustrates a form of my invention especially adapted to the control of pressure within a vessel by controlling the feed of fuel gas to a burner, but the drawing is only for the purpose of illustrating an example of the operation and adaptability of the control valve.

In the drawing:

Figure 1 is a side elevational view of the control valve;

Figure 2 is a partly sectioned and somewhat enlarged detail view showing the valve disc, disc nipple and disc retaining sleeve; and Figure 3 is a vertical sectional view taken through the view shown in Figure 1.

In carrying out the invention, there is provided a housing consisting of the valve body 1, the base 10, and the center fitting 8. The valve nozzle 27 is a part of the valve body 1 and extends into a valve chamber shown at 23. A valve disc 4 is held in position against a disc nipple 5 by means of a disc-retaining sleeve 28. A spring 2 tends to open or hold the valve open and opposes the action of an expansible chamber indicated at 16. The fluid in the valve chamber 23 is separated from the fluid in the expansible chamber 16 by a valve chamber diaphragm or bellows 21, the vent chamber, shown at 18, and the wall 9 of the expansible chamber 16. The vent chamber is open to the atmosphere and the discharge therefrom is piped to a predetermined safe point. The expansible chamber 16 is held securely in proper position by a lock nut 13. The flexible diaphragm or bellows 21 eliminates the necessity of providing a packing gland in order to transmit the movement of the expansible chamber 16 to the disc nipple 5 and the valve disc 4. The construction of this device makes it possible to assemble the complete valve parts and test the valve, including the diaphragm 21, for positive seal for maximum flow and valve disc 4 for positive closure, before assembling the completed device. The complete valve assembly consists of the valve body 1, spring 2, disc retaining sleeve 28, valve disc 4, disc nipple 5, diaphragm 21, diaphragm washer 19, diaphragm lock nut washer 6, diaphragm lock nut 7, center fitting 8, lock screw 20, inlet fitting 24, inlet screen 25, and outlet fitting 26. The construction of the base 10, center fitting 8, expansible chamber 9, expansible chamber nipple 14, and lock nut 13 permit the assembling of these parts after the valve assembly has been properly tested. The expansible chamber nipple 14 contains a passageway 16a through the entire nipple—one end of which terminates within the expansible chamber 16, the other end of which is restricted as shown at 15 to permit passage of a very small amount of fluid. The novel feature of this restriction is one of the objects of the invention.

The operation of the valve is as follows: slight variations in the controlled pressure, which is introduced into the expansible chamber 16 through the restricted duct or inlet 15 in the nipple 14, cause the bellows to expand as the pressure increases, thus overcoming the force of the spring 2, and thereby moving the valve disc 4 toward the face of the valve nozzle 27, reducing the annular space 3 which retards the flow of controlling fluid passing through the valve. Likewise, when the pressure is reduced in the expansible chamber 16, the force of the spring 2 causes the valve disc 4 to move away from the face of the valve nozzle 27, thereby increasing the annular space 3 which increases the flow of controlling fluid passing through the valve. The controlling fluid enters the valve chamber 23 through the passageway 24a in the inlet fitting 24, passing through inlet screen 25, then (when the valve is open) the fluid passes through the ports 22 in the disc retaining sleeve 28 and between the valve nozzle 27 and the sleeve 28, through valve nozzle passageway 27a and outlet fitting passageway 26a to the burner. The vent chamber 18 separates the valve chamber 23 from the expansible chamber 16, and also maintains atmospheric pressure on the outside face of valve chamber diaphragm 21 and the outside surface of the expansible chamber 9. Vent fitting 17, attached to the base 10, provides a means for conducting vent through vent fitting passageway 17a to a predetermined safe point away from the location of the valve.

Where the temperature of some object or medium is to be controlled, the actuating pressure within the expansible chamber 16 is obtained by means of a conventional thermostatic bulb located at the point where the temperature is to be controlled and connected to the expansible chamber nipple 14 by means of tubing—thermostatic bulb, tubing, and expansible chamber to be filled with proper fluid and hermetically sealed.

While the disclosure reveals a practical working embodiment of the invention, it is to be understood that changes, alterations and modifications may be made therein, in keeping with the spirit thereof, and which may be said to fall fairly within the scope and meaning of the appended claims.

What is claimed as new is:

1. In a device of the character described, the combination of a valve assembly, a valve body having inlet and outlet passageways; a base; means for connecting the valve body to the base; said valve body providing a valve chamber; said base providing a vent chamber, a vent therefor; an element constituting an expansible chamber carried in said vent chamber; a valve chamber diaphragm operably associated with the expansible chamber and in said valve assembly; a valve nozzle having a passageway and disposed in the valve chamber in line with said valve assembly; an opening in said base, an expansible chamber nipple in said opening, said nipple having a restricted passageway to permit entrance of a suitable medium under slight variations of pressure to actuate said expansible chamber, the valve chamber diaphragm and the valve assembly in the opening and closing thereof, in the manner and for the purposes described.

2. In a device of the character described, the combination of a valve assembly, a valve body having inlet and outlet passageways; a base, means for connecting the valve body to the base; said valve body providing a valve chamber, said base providing a vent chamber with a single vent; an element constituting an expansible chamber carried in said vent chamber, a valve chamber bellows operably associated with the expansible chamber, a valve nozzle having a passageway and disposed in the valve chamber in line with said valve assembly; said valve assembly consisting of a diaphragm, a perforated disk-retaining sleeve, a valve disk, a disk nipple, a spring, and means for holding the parts together; an opening in said base, an expansible chamber nipple in the opening, said nipple having a predetermined restricted passageway to permit outside or extraneous pressure under variations of a foreign medium to actuate said expansible element and the valve chamber bellows and its valve parts in the opening and closing of the valve; said nipple having said restricted passageway of a size in proper relation to the size of the single vent passageway to prevent increase of pressure in said vent chamber and to reduce the volume of escaping fluid in case of rupture of the expansible chamber.

3. In a device of the character described, the combination of a valve assembly, a valve body having inlet and outlet passageways; a base, means for connecting the valve body to the base; said valve body providing a valve chamber, said base providing a vent chamber, a vent for the vent chamber; an element constituting an expansible chamber and carried in said vent chamber; a diaphragm operably associated with the expansible chamber and forming part of the valve assembly; a valve nozzle having a passageway and disposed in the valve chamber in line with said valve assembly; an opening in said base, an expansible chamber nipple in the opening, said nipple having a restricted passageway to permit remote pressure under slight variations of a suitable element to actuate said expansible chamber, diaphragm and valve assembly in the opening and closing thereof.

4. A device of the character described such as defined and as claimed in claim 3, and wherein said base provides a vent chamber having a single vent for the purpose of conducting escaping fluid either from the vent chamber in case of rupture of the expansible chamber wall, or the valve chamber in case of rupture of the valve chamber diaphragm, or from both said chambers in case the expansible chamber wall and valve chamber diaphragm rupture simultaneously.

JAMES WOODWARD MARTIN.